United States Patent
Mortensen (10) Patent No.: US 10,854,883 B2
(45) Date of Patent: Dec. 1, 2020

(54) BUCKLING RESISTANT CURRENT COLLECTOR

(71) Applicant: ENERGIZER BRANDS, LLC, St. Louis, MO (US)

(72) Inventor: Erik Mortensen, Waunakee, WI (US)

(73) Assignee: ENERGIZER BRANDS, LLC, St Louis, MO (US)

( * ) Notice: Subject to any disclaimer, the term of this patent is extended or adjusted under 35 U.S.C. 154(b) by 230 days.

(21) Appl. No.: 15/518,830

(22) PCT Filed: Oct. 14, 2015

(86) PCT No.: PCT/US2015/055609
§ 371 (c)(1),
(2) Date: Apr. 13, 2017

(87) PCT Pub. No.: WO2016/061282
PCT Pub. Date: Apr. 21, 2016

(65) Prior Publication Data
US 2017/0244106 A1    Aug. 24, 2017

Related U.S. Application Data

(60) Provisional application No. 62/064,551, filed on Oct. 16, 2014.

(51) Int. Cl.
*H01M 4/74* (2006.01)
*H01M 4/66* (2006.01)
(Continued)

(52) U.S. Cl.
CPC .............. *H01M 4/747* (2013.01); *H01M 4/42* (2013.01); *H01M 4/662* (2013.01); *H01M 4/75* (2013.01);
(Continued)

(58) Field of Classification Search
CPC ................................ H01M 4/747; H01M 4/75
See application file for complete search history.

(56) References Cited

U.S. PATENT DOCUMENTS 3,769,689 A * 11/1973 Little ................. B23K 35/3033
228/199
3,836,397 A * 9/1974 Hardman .............. H01M 4/248
429/206
(Continued)

FOREIGN PATENT DOCUMENTS

JP    H06-096772 A    4/1994
JP    H08-162173 A    6/1996
(Continued)

OTHER PUBLICATIONS

AZOM nickel 200 properties data "https://www.azom.com/article.aspx?ArticleID=9283" (Year: 2013).*
(Continued)

*Primary Examiner* — Sarah A. Slifka
*Assistant Examiner* — Brent C Thomas
(74) *Attorney, Agent, or Firm* — Foley & Lardner LLP (57) ABSTRACT

A wire mesh including a warp which includes a first nickel alloy wire having a first peak tensile strength; and a weft which includes a wire including nickel having a second peak tensile strength, wherein the first peak tensile strength is greater than or equal to the second peak tensile strength, is provided. A current collector and a zinc-air battery that includes the wire mesh are also provided.

19 Claims, 3 Drawing Sheets (51) Int. Cl.
*H01M 4/42* (2006.01)
*H01M 12/06* (2006.01)
*H01M 4/75* (2006.01)

(52) U.S. Cl.
CPC .... *H01M 12/06* (2013.01); *H01M 2300/0014* (2013.01)

(56) References Cited

U.S. PATENT DOCUMENTS

| | | | | |
|---|---|---|---|---|
| 5,587,259 | A * | 12/1996 | Dopp | H01M 4/661 148/407 |
| 5,637,117 | A | 6/1997 | Dopp et al. | |
| 2002/0019564 | A1 * | 2/2002 | Morgenstern | B01J 23/72 562/539 |
| 2008/0044640 | A1 | 2/2008 | Wang Chen | |
| 2009/0011293 | A1 * | 1/2009 | Wood | B01J 23/52 429/479 |

FOREIGN PATENT DOCUMENTS

| | | |
|---|---|---|
| JP | 2002-151086 A | 5/2002 |
| JP | 2002-280026 A | 9/2002 |
| JP | 2009-146846 A | 7/2009 |
| JP | 2011-009608 A | 1/2011 |
| JP | 2011-009609 A | 1/2011 |
| WO | WO-2014/131799 A1 | 9/2014 |

OTHER PUBLICATIONS

Nickel 200 properties, Special Metals https://www.specialmetals.com/assets/smc/documents/alloys/nickel-duranickel/nickel-200-201.pdf (Year: 2019).*

International Search Report and Written Opinion in PCT/US2015/055609 dated Feb. 23, 2016 (12 pages).

Extended European Search Report received for EP15850936.4, dated Mar. 8, 2018 (8 pages).

Office Action in JP Patent Application No. 2017-520474 dated Aug. 13, 2019 (8 pages).

* cited by examiner

BUCKLING RESISTANT CURRENT COLLECTOR

CROSS-REFERENCE TO RELATED APPLICATIONS

This application is a U.S. National Phase Application under 35 U.S.C. § 371 of International Application No. PCT/US2015/055609, filed on Oct. 14, 2015, which claims the benefit of U.S. Provisional Application Nos. 62/064,551, filed Oct. 16, 2014, the entire contents of which are hereby incorporated by reference in their entirety.

FIELD

The present technology is generally related to batteries. In particular, the present technology is related to current collectors that resist buckling upon insertion into a battery can.

SUMMARY

In one aspect, a wire mesh is provided including a warp which includes a first nickel alloy wire having a first peak tensile strength; and a weft which includes a wire including nickel having a second peak tensile strength, wherein the first peak tensile strength is greater than or equal to the second peak tensile strength.

In another aspect, an expanded metal mesh is provided including a nickel metal alloy which includes at least 90 wt % nickel and less than 10 wt % aluminum.

In yet another aspect, a zinc-air battery is provided, including a wire mesh current collector which includes a warp including a first nickel alloy wire having a first peak tensile strength and a weft including a wire which includes nickel and having a second peak tensile strength, wherein the first peak tensile strength is greater than or equal to the second peak tensile strength.

In one aspect, a zinc-air battery is provided, which includes a wire mesh current collector comprising a wire warp and a wire weft, wherein the current collector exhibits at least one or more of the following properties: (a) a metal of the wire mesh is substantially insoluble in an aqueous caustic electrolyte; (b) a wire of the warp or weft prior to incorporation in the mesh exhibits a hardness of from about 130 to about 375 Brinell; (c) a wire of the warp or weft prior to incorporation in the mesh exhibits a resistivity of from about $2 \times 10^{-7}$ Ωm to about $5 \times 10^{-7}$ Ωm at 20° C.; (d) a wire of the warp or weft prior to incorporation in the mesh exhibits a peak tensile strength of greater than 140 ksi; and (e) a wire of the warp or weft prior to incorporation in the mesh exhibits a Young's Modulus of from about 180 GPa to about 240 GPa.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and may be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a," "an," and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, 5 to 40 mole % should be interpreted to include not only the explicitly recited limits of 5 to 40 mole %, but also to include sub-ranges, such as 10 mole % to 30 mole %, 7 mole % to 25 mole %, and so forth, as well as individual amounts, including fractional amounts, within the specified ranges, such as 15.5 mole %, 29.1 mole %, and 12.9 mole %, for example.

As used herein, the terms "warp" and "weft" refer to the orthogonal runs of the mesh, i.e. the lengthwise runs and the orthogonal runs wherein the weft runs are inserted over-and-under the warp runs. However, the terms are not used in a manner entirely consistent with cloth weaving, because the mesh described herein is open on each direction after bonding of the orthogonal runs of wire. That is, the warp and the weft are interchangeable once the mesh is released from the loom during production. Accordingly, as defined herein, the warp and weft are interchangeable with regard to the types of materials forming each; the terms only signify the orthogonal runs of materials.

The term "tensile strength," as used herein, is defined in accordance with the pertinent art and relates to the maximum stress that a material may withstand while being stretched or pulled. Tensile strength is defined as a stress, which is measured as force per unit area. The tensile strength is generally expressed in terms of psi (pounds per square inch) or ksi (kips per square inch; 1 kip=1000 psi). Tensile strength as referred to herein is the tensile strength as measured according to ASTM C1557—Standard Test Method for Tensile Strength and Young's Modulus of Fibers.

The term "mesh density," as used herein, is defined as the weight ratio of wire mesh to solid metal, where the wire mesh and the solid have the same or similar thickness and surface area.

The term "aperture size" of the wire refers to the distance between two neighboring warp or weft wires, measured in the center of the aperture.

The term "mesh count" of the wire refers to the number of apertures per English inch (25.4 mm).

The term "wire diameter" refers to the diameter of the wire measured before weaving.

The term "pitch" of the wire refers to distance between the middle point of two adjacent wires or the sum of the aperture width and the one wire diameter.

The term "mesh thickness" refers to the average thickness of the mesh and is based on the wire diameter, weaving process and weaving pattern.

As used herein, the phrase "substantially insoluble" refers to any amount of a wire mesh not dissolved in the electrolyte.

It has now been found that a wire material, which is stiffer when compared to conventional materials, may be used as a cathode current collector in air batteries. The stiffer wire increases battery product yields during manufacture by lowering the incidence of batteries having poor contact between the current collector and side walls of the battery can, as indicated by impedance measurements above a given threshold. The stiffer provides for a greater number of cells having sufficiently low, initial impedance measurements and a lower number of battery rejections. Without being bound by theory, it is believed that the increased tensile strength and buckling resistance of this wire, when woven into a mesh, provides minimal deformation of the current collector leading to enhanced contact to the sidewall of the battery can, thereby reducing the proportion of high impedance cells. Such batteries also tend to exhibit better performance characteristics than control batteries (i.e. control batteries—those without the stiffer wire material).

In one aspect, a wire mesh is provided, which includes warp wires and weft wires, wherein the warp wires include a first nickel alloy wire having a first peak tensile strength, and the weft wires include nickel having second peak tensile strength, and wherein the first peak tensile strength is greater than or equal to the second peak tensile strength. In some embodiments, the first peak tensile strength is greater than the second peak tensile strength. In other embodiments, the first peak tensile strength is equal to the second peak tensile strength. In some embodiments, the weft wires and the warp wires are interchangeable.

Figure 1:
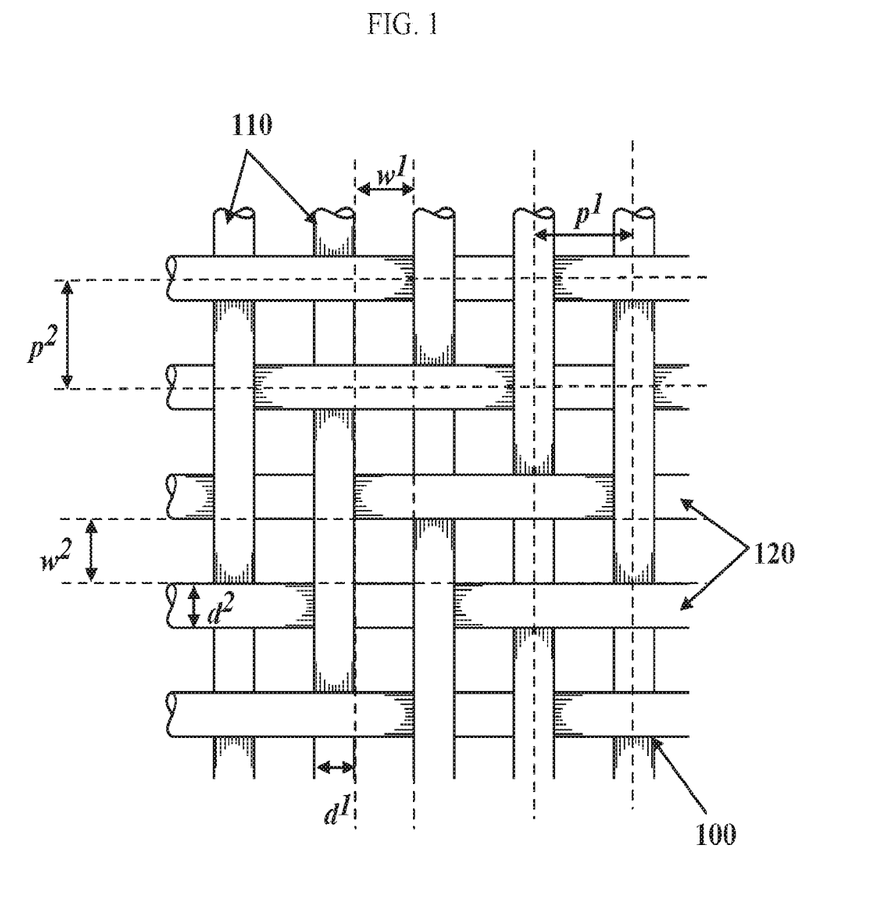
FIG. 1 is a cross-sectional, schematic view depicting an exemplary wire mesh of an embodiment of the present disclosure.

Referring particularly to FIG. 1, an enlarged cross-section of one embodiment of the wire mesh is shown. The wire mesh 100 consists of warp wires 110, which are composed of a first nickel alloy wire having a first peak first tensile strength, and weft wires 120, composed of nickel having second peak having a second tensile strength. The warp wires are described in terms of wire diameter $d^1$, pitch $p^1$ and aperture size $w^1$. The weft wires are described in terms of wire diameter $d^2$, pitch $p^2$ and aperture size $w^2$. The mesh is open on each direction after bonding of the orthogonal runs of wire thereby rendering the warp and the weft interchangeable. The wire mesh may be used in the construction of batteries, e.g., metal-air batteries. The wire mesh may form either electrode or current collector for either electrode in a battery. When used as a cathode or cathode current collector, the wire mesh is introduced to a battery can such that distal ends of the mesh each contact interior walls of the battery can. When materials having a low tensile strength are used, the mesh buckles at an unacceptably high rate leading to high impedance and cell failure. The wire mesh described herein has high tensile strength. The use of the wire mesh described herein therefore results in reduced buckling incidence, resulting in impedance values remaining below specified limits, and a lower failure rate.

The wires of the mesh are composed of suitable conductive materials capable of interfacing, as an electrode or a current collector for an electrode, e.g., with the cathode assembly of an electrochemical cell. For example, the wire mesh may include wires made of nickel-based materials.

In addition to nickel, the wires of the mesh may contain other components, such as for example, other metals. In some embodiments, the wires may be in the form of an alloy. For example, the weft wire including the first nickel alloy wire may include nickel and aluminum. In some embodiments, the first nickel alloy wire may include at least about 85 wt % nickel. This includes at least about 90 wt %, at least about 91 wt %, at least about 92 wt %, at least about 93 wt %, at least about 94 wt %, or at least about 95 wt % nickel. In some embodiments, the first nickel alloy wire may include less than about 15 wt % aluminum. This includes less than about 12 wt %, less than about 10 wt %, less than about 9 wt %, less than about 8 wt %, less than about 7 wt %, less than about 6 wt %, less than about 5 wt %, less than about 4 wt %, or less than about 3 wt % aluminum. In some embodiments, the first nickel alloy includes at least 85 wt % nickel and less than 15 wt % aluminum. This includes at least about 85 wt % nickel and less than about 15 wt % aluminum, at least about 88 wt % nickel and less than about 12 wt % aluminum, at least about 90 wt % nickel and less than about 10 wt % aluminum, at least about 95 wt % nickel and less than about 5 wt % aluminum, or at least about 96 wt % nickel and less than about 4 wt % aluminum. In other embodiments, the first nickel alloy wire includes from about 90 wt % to about 99 wt % nickel and from about 1 wt % to about 10 wt % aluminum. This includes from about 91 wt % to about 98 wt % nickel and from about 2 wt % to about 9 wt % aluminum, from about 93 wt % to about 97 wt % nickel and from about 3 wt % to about 7 wt % aluminum, from about 95 wt % to about 96 wt % nickel and from about 4 wt % to about 5 wt % aluminum, and ranges between any two of these values or less than any one of these values. In some embodiments, the first nickel alloy wire includes at least 90 wt % nickel and less than 10 wt % aluminum. In other embodiments, the first nickel alloy wire comprises from about 93 wt % to about 97 wt % nickel and from about 3 wt % to about 7 wt % aluminum.

In addition to nickel and aluminum, the first nickel alloy wire may include other suitable components. For example, the first nickel alloy may include at least one of copper, iron, manganese, carbon, silicon, sulfur, and titanium. The other suitable components, if present, may be included in a total amount from about 0 wt % to about 2 wt %. This includes from about 0.00001 wt % to about 1 wt %, from about 0.0001 wt % to about 0.5 wt %, from about 0.001 wt % to about 0.1 wt %, or from about 0.01 wt % to about 0.08 wt %, and ranges between any two of these values or less than any one of these values.

In some embodiments, the first nickel alloy wire is a fully annealed wire. In other embodiments, the first nickel alloy wire is a half-hard annealed wire. In some embodiments, the first nickel alloy wire is a drawn out wire. In some embodiments, the first nickel alloy wire is an extruded wire. In some embodiments, the first nickel alloy wire is a cold-formed or a hot-formed wire. The first nickel alloy wire may be annealed at a temperature of from about 400° C. to about 1400° C. for from 0 minutes to 10 hours, depending on the thickness and presence of alloys. In some embodiments, the first nickel alloy wire is annealed at a temperature of from about 500° C. to about 1200° C., from about 550° C. to about 1100° C., from about 600° C. to about 1000° C., from about 700° C. to about 900° C., or from about 750° C. to about 850° C., and ranges between any two of these values or less than any one of these values. In some embodiments, the annealing temperature for the first nickel alloy wire is from about 500° C. to about 600° C. In other embodiments, the annealing temperature for the first nickel alloy wire is from about 600° to 800° C. In some embodiments, the first nickel alloy wire is annealed for a time of greater than about 5 minutes, greater than about 30 minutes, greater than about 45 minutes, greater than about 1 hour, greater than about 5 hour, or greater than about 10 hour, and ranges between any two of these values or less than any one of these values. In some embodiments, the annealing time is from about 1 hour to about 8 hour. In some embodiments, the first nickel alloy wire is an annealed wire. In some embodiments, the first nickel alloy wire is a half-hard wire.

In some embodiments, the wire mesh includes warp wires which include wires made of nickel and may have greater than 80% nickel. This includes greater than about 80%, greater than about 85%, greater than about 90%, greater than about 91%, greater than about 92%, greater than about 93%, greater than about 94%, greater than about 95%, greater than about 96%, greater than about 97%, greater than about 98%, or greater than about 99% nickel. In one embodiment, the wire which includes nickel has greater than 99% nickel. In some embodiments, wire which includes nickel has greater than 99.5% nickel. In one embodiment, the weft wire includes nickel and has greater than 99% nickel. In some embodiments, the weft wire includes nickel and has greater than 99.5% nickel.

In some embodiments, the wire which includes nickel is a second nickel alloy wire. In some embodiments, the wire which includes nickel may further include other components. For example, the wire which includes nickel may be a second nickel alloy wire which includes at least one of copper, iron, manganese, carbon, silicon, sulfur, titanium, magnesium, molybdenum, arsenic, or vanadium. In some embodiments, the first and the second nickel alloy wires have the same composition. In some embodiments, the first and the second nickel alloy wires have different composition. In some embodiments, the first nickel alloy wire, the second nickel alloy wire, or both, are coated with a coating of same or other conductive material.

In addition to nickel or nickel containing alloys described herein, the wire mesh may include wires made of other materials such as nickel-plated stainless steel; nickel-clad stainless steel; cold-rolled steel plated with nickel; INCONEL® (a non-magnetic alloy of nickel); pure nickel with minor alloying elements (e.g. Nickel 200 and related family of Nickel 200 alloys such as Nickel 201, etc.), all available from Huntington Alloys, and DURANICKEL® 301, available from Special Metals. In one embodiment, some noble metals may also find use as plating, cladding, or other coating for can metals, including covering the wires, the wires plated with nickel, and wires before or after fabricating the can.

The wire mesh described herein has low electrical resistivity which readily allows the movement of electric charge. The electrical resistivity, in general, quantifies how strongly a given material opposes the flow of electric current. In some embodiments, the first nickel alloy wire has a resistivity, when measured at 20° C. of from about $5 \times 10^{-8}$ Ωm to about $1 \times 10^{-6}$ Ωm. This includes a resistivity of from about $1 \times 10^{-8}$ Ωm to about $9 \times 10^{-7}$ Ωm, from about $2 \times 10^{-7}$ Ωm to about $5 \times 10^{-7}$ Ωm, from about $3 \times 10^{-7}$ Ωm to about $4 \times 10^{-7}$ Ωm, and ranges between any two of these values or less than any one of these values. In some embodiments, the first nickel alloy wire has a resistivity of from about $2 \times 10^{-7}$ Ωm to about $5 \times 10^{-7}$ Ωm at 20° C.

The individual wires or the wire mesh may be subjected to additional conditioning or treatment methods to improve their properties. For example, the wires described herein may be subjected to annealing prior to, or after, formation of the mesh. The term annealing generally refers to a heat treating process which may modify the crystal structure and/or harden or soften the material for improved fabricating. The temperature and duration of the heat will vary according to the composition and thickness of the wire. Thus in one embodiment, the wire including nickel may be an annealed wire.

In some embodiments, the wire including nickel is a fully annealed wire. In other embodiments, the wire including nickel is a half-hard annealed wire. In some embodiments, the wire including nickel is a drawn out wire. In some embodiments, the wire including nickel is an extruded wire. The wire including nickel may be annealed at a temperature of from about 400° C. to about 1400° C. for from 0 minutes to 10 hours, depending on the thickness and presence of alloys. In some embodiments, the wire including nickel is annealed at a temperature of from about 500° C. to about 1200° C., from about 550° C. to about 1100° C., from about 600° C. to about 1000° C., from about 700° C. to about 900° C., or from about 750° C. to about 850° C., and ranges between any two of these values or less than any one of these values. In some embodiments, the annealing temperature for the wire including nickel is from about 500° C. to about 600° C. In other embodiments, the annealing temperature for the wire including nickel is from about 700° to 950° C. In some embodiments, the wire including nickel is annealed for a time of greater than about 5 minutes, greater than about 30 minutes, greater than about 45 minutes, greater than about 1 hour, greater than about 5 hours, or greater than about 10 hours, and ranges between any two of these values or less than any one of these values. In some embodiments, the annealing time is from about 30 minutes to about 4 hours. In some embodiments, the wire including nickel is an annealed wire. In some embodiments, the wire including nickel is a half-hard wire.

The technology provides wire mesh having a first nickel alloy wire having a high tensile strength (prior to incorporation in the mesh) of greater than about 120 ksi. This includes embodiments in which the first nickel alloy wire has a peak tensile strength of greater than 130 ksi, greater than 140 ksi, greater than 150 ksi, greater than 160 ksi, greater than 170 ksi, greater than 180 ksi, greater than 190 ksi, greater than 200 ksi, greater than 210 ksi, greater than 220 ksi, or greater than 230 ksi. In some embodiments, the first nickel alloy wire has a peak tensile strength of less than 400 ksi, less than 350 ksi, less than 300 ksi, less than 250 ksi, less than 240 ksi, less than 230 ksi, less than 220 ksi or less than 210 ksi. In some embodiments, the first nickel alloy wire has a peak tensile strength of from about 120 ksi to about 350 ksi, from about 130 ksi to about 300 ksi, from about 140 ksi to about 250 ksi, from about 150 ksi to about 240 ksi, from about 175 ksi to about 230 ksi, from about 200 ksi to about 225 ksi, from about 210 ksi to about 220 ksi, and ranges between any two of these values or less than any one of these values. In some embodiments, the first nickel alloy wire has a peak tensile strength of greater than 140 ksi. In other embodiments, the first nickel alloy wire has a peak tensile strength of greater than 180 ksi. In some embodiments, the first nickel alloy wire has a peak tensile strength of greater than 200 ksi. In some embodiments, the first nickel alloy wire has a peak tensile strength of greater than 210 ksi. In some embodiments, the first nickel alloy wire has a peak tensile strength of less than 350 ksi. In other embodiments, the first nickel alloy wire has a peak tensile strength of less than 300 ksi. In some embodiments, the first nickel alloy wire has a peak tensile strength of less than 230 ksi. In some embodiments, the first nickel alloy wire has a peak tensile strength of from about 140 ksi to about 250 ksi. In some embodiments, the first nickel alloy wire has a peak tensile strength of from about 200 ksi to about 225 ksi.

The technology provides wire mesh with a second nickel alloy wire having a tensile strength of greater than about 60 ksi. This includes embodiments in which the second nickel alloy wire has a peak tensile strength of greater than 70 ksi, greater than 80 ksi, greater than 90 ksi, greater than 100 ksi, greater than 110 ksi, greater than 120 ksi, greater than 130 ksi, greater than 150 ksi, greater than 180 ksi, greater than 130 ksi, or greater than 200 ksi. In some embodiments, the second nickel alloy wire has a peak tensile strength of from about 50 ksi to about 240 ksi, from about 60 ksi to about 220 ksi, from about 70 ksi to about 200 ksi, from about 80 ksi to about 150 ksi, from about 100 ksi to about 145 ksi, from about 110 ksi to about 140 ksi, or from about 120 ksi to about 130 ksi, and ranges between any two of these values or less than any one of these values. In some embodiments, the second nickel alloy wire has a peak tensile strength of greater than 60 ksi. In some embodiments, the second nickel alloy wire has a peak tensile strength of greater than 80 ksi. In some embodiments, the second nickel alloy wire has a peak tensile strength of greater than 100 ksi. In some embodiments, wherein the second nickel alloy wire has a peak tensile strength of greater than 120 ksi. In some embodiments, the second nickel alloy wire has a peak tensile strength of greater than 200 ksi. In some embodiments, the second nickel alloy wire has a peak tensile strength of greater than 150 ksi. In some embodiments, the second nickel alloy wire has a peak tensile strength of from about 80 ksi to about 150 ksi. In some embodiments, the second nickel alloy wire has a peak tensile strength of from about 110 ksi to about 140 ksi.

The hardness of the wire mesh will vary depending on the bond strength, the method of testing and the plane of recordation. In some embodiments, a wire of the warp or weft prior to incorporation in the mesh exhibits a microhardness of about 120 kgf/mm$^2$ to about 450 kgf/mm$^2$. This includes a microhardness of from about 130 kgf/mm$^2$ to about 395 kgf/mm$^2$, about 160 kgf/mm$^2$ to about 350 kgf/mm$^2$, about 170 kgf/mm$^2$ to about 300 kgf/mm$^2$, about 180 kgf/mm$^2$ to about 270 kgf/mm$^2$, about 190 kgf/mm$^2$ to about 260 kgf/mm$^2$, about 200 kgf/mm$^2$ to about 250 kgf/mm$^2$, about 220 kgf/mm$^2$ to about 240 kgf/mm$^2$, and ranges between any two of these values. The microhardness may be tested using Vickers hardness test (or interconverted to other hardnesses such as measured by the Knoop hardness test) using standard guidelines, e.g. the ASTM E384 guidelines. In some embodiments, in order to obtain the desired properties, the wires or the mesh may be further subjected to age hardening. In some embodiments, a wire of the warp or weft prior to incorporation in the mesh exhibits a hardness of from about 100 to about 450 Brinell. This includes from about 120 to about 400 Brinell, about 130 to about 375 Brinell, about 150 to about 350 Brinell, about 200 to about 300 Brinell, or about 230 to about 270 Brinell, and ranges between any two of these values.

In some embodiments, the warp wire which is the first nickel alloy has a microhardness from about 160 kgf/mm$^2$ to about 350 kgf/mm$^2$, while the weft which is the wire comprising nickel, or the second nickel alloy has a microhardness from about 90 kgf/mm$^2$ to about 150 kgf/mm$^2$. This includes the first nickel alloy having a microhardness from about 170 kgf/mm$^2$ to about 300 kgf/mm$^2$, about 180 kgf/mm$^2$ to about 270 kgf/mm$^2$, about 190 kgf/mm$^2$ to about 260 kgf/mm$^2$, about 200 kgf/mm$^2$ to about 250 kgf/mm$^2$, about 220 kgf/mm$^2$ to about 240 kgf/mm$^2$, and ranges between any two of these values. This also includes the second nickel alloy having a microhardness from about 95 kgf/mm$^2$ to about 150 kgf/mm$^2$, about 95 kgf/mm$^2$ to about 120 kgf/mm$^2$, about 95 kgf/mm$^2$ to about 110 kgf/mm$^2$, and ranges between any two of these values. For example, the warp may have a microhardness of about 200 kgf/mm$^2$, while the weft may have a microhardness of about 100 kgf/mm$^2$.

The technology provides wire mesh with a first nickel alloy wire having yield strength of greater than about 20 ksi with an offset of 0.2%. This includes yield strength of greater than about 40 ksi, greater than about 60 ksi, greater than about 80 ksi, greater than about 100 ksi, greater than about 120 ksi, greater than about 140 ksi, greater than about 180 ksi, greater than about 200 ksi or greater than about 220 ksi. In some embodiments, the technology provides a wire mesh with a first nickel alloy having a yield strength of from about 20 ksi to about 300 ksi. This includes a yield strength of from about 40 ksi to about 250 ksi, from about 60 ksi to about 220 ksi, from about 80 ksi to about 200 ksi, of about 100 ksi to about 180 ksi, of about 120 ksi to about 140 ksi, and ranges between any two of these values or less than any one of these values.

Depending on the diameter of the wire, the mesh count of the wire mesh may range from about 10×10 wires per inch to about 100×100 wires per inch. This includes a mesh count of about 12×12 wires per inch to about 80×80 wires per inch, about 16×16 wires per inch to about 60×60 wires per inch, about 20×20 wires per inch to about 50×50 wires per inch, from about 30×30 wires per inch to about 40×40 wires per inch, about 12×100 wires per inch to about 100×12 wires per inch, about 15×40 wires per inch to about 40×15 wires per inch, about 16×60 wires per inch to about 60×16 wires per inch, or from about 20×40 wires per inch to about 40×20 wires per inch, and ranges between any two of these values or less than any one of these values. In some embodiments, the mesh count of the wire mesh is from about 16×16 wires per inch to about 60×60 wires per inch. In other embodiments, the mesh count of the wire mesh is from about 30×30 wires per inch to about 40×40 wires per inch. In some embodiments, the mesh count of the wire mesh is from about 16×60 wires per inch to about 60×16 wires per inch.

The wires of the mesh may be configured to have the similar or different diameters. For example, the warp wires may have similar diameter or larger or smaller diameter than the diameter of the weft wires. In some embodiments, the wire including nickel has a cross-section diameter ($d^2$) greater than the diameter ($d^1$) of the first nickel alloy wire. For example, the cross-section diameters of the wire including nickel and the first nickel alloy wire may have a ratio of about 1:9 to about 9:1. This includes a ratio between about 1:4 and about 4:1, more suitably between about 1:3 and about 3:1, and even more suitably between about 1:2 and about 2:1. In some embodiments, the cross-section diameters of the wire which includes nickel and the first nickel alloy wire have a ratio of about 1:1 to about 2:1, about 1.5:1 to about 1:1, or about 1.25:1 to about 1:1. In some embodiments, the cross-section diameters of the wire including nickel and the first nickel alloy wire are equal or about equal.

In order to improve the conductivity of the mesh, it is designed to provide a high amount of conductive material per unit of surface area of a conductive region or electrode. This property may be expressed in terms of the mesh density of the wire mesh which is a measure of a percentage of area with fill or conductive lines relative to the total surface area of a conductive region. As an example and not by way of limitation, the wire mesh may have a mesh density from about 0.001% to about 20% of the total surface area of the conductive region. This includes a mesh density of from about 0.05% to about 10%, from about 0.01% to about 1%, from about 0.1% to about 0.5%, from about 0.2% to about 0.4% or from about 0.25% to about 0.35% of the total surface area of the conductive region, and ranges between any two of these values or less than any one of these values.

Various methods may be used to prepare the mesh. For example, the warp and the weft wires may be left unwoven or may be woven in a desired pattern. Standard weaving techniques known in the art may be used to weave the warp and weft wires. Generally, the wires are positioned to be equidistant from each other so as to form a uniform weaving pattern, but need not necessarily be so. Suitable weaving patterns include, but are not limited to, a plain weave, a basket weave, a twill weave, a satin weave, a herringbone weave, a leno weave, a rep weave, a rib weave, a warp rib weave, a Dutch weave, and velour weave as known to one skilled in the art, or a combination of any two or more thereof. In some embodiments, the wire mesh is a woven mesh having a plain square weave, a twill square weave, plain Dutch weave, or a twill Dutch weave, or combinations thereof. In some embodiments, the mesh may include any combination of two or more weave patterns. The weave pattern may be a sparse weave or a dense weave. The sparse weave pattern will result in larger openings in the wire mesh which is desirable for certain applications. The dense weave will result in smaller openings in the wire mesh which may be required for certain other applications.

The woven or unwoven network of wires may be subjected to additional processing such as thermal bonding, chemical bonding or mechanical bonding to form the mesh. For example, the mesh may be formed by cold calendaring of the warp and the weft. Calendering refers to the passing of the wire between rollers under pressure and optionally at high temperatures. Calendering helps flatten the high points at the intersection of the wires, reduce the thickness of the wire cloth and give the material a smooth surface. In some embodiments, the mesh is formed by crimping the wires at the intersection such that corrugations are formed in the wires so as to lock the wires in place.

In some embodiments, the mesh is formed by the thermal bonding of the warp and the weft. Thermal bonding refers to a process wherein the intersections of the weft and warp wires are heated to high temperatures or soldered together. The heating may be done without the application of pressure. The temperature of the thermal bonding will vary depending on the composition of the wire and/or the melting point of the wire materials. In some embodiments, the intersections of the warp and weft wires may be soldered using suitable soldering materials. In some embodiments, the mesh wires are subjected to welding. In other embodiments, the mesh wires may be subjected to brazing.

In some embodiments, the mesh is formed by coating of the mesh with a suitable coating of electrical conductive materials such as other metals. Thus, in some embodiments, the woven or unwoven network or warp and weft wires may be coated with another metal. Examples of metals suitable for coating the mesh include silver, gold, copper, aluminum, nickel, tungsten, zinc, iron, platinum, tin, steel and other electric conductive metals or alloys thereof or combinations thereof. In one embodiment, the mesh is coated with nickel. The coating is applied in a way so as to keep the wires in position.

The thickness of the wire mesh may be measured in terms of the thickness of the individual wires or the combined thickness of the warp and weft wires. In some embodiments, the wire mesh may have a thickness from about 0.01 µM to about 200 µM. This includes a thickness from about 0.05 µM to about 150 µM, about 0.1 µM to about 100 µM, about 1 µM to about 70 µM, about 2 µM to about 50 µM, about 5 µM to about 20 µM, about 10 µM to about 18 µM, about 14 µM to about 17 µM, or about 15 µM to about 16 µM, and ranges between any two of these values or less than any one of these values. In some embodiments, the wire mesh has a thickness from about 5 to about 20 µM. In some embodiments, the wire mesh has a thickness from about 14 to about 17 µM.

The wires of the mesh may be configured to have the desired elasticity or stiffness, which may be expressed in terms of their Young's Modulus. In some embodiments, the first nickel alloy wire has a Young's Modulus of greater than 120 GPa. This includes a Young's Modulus of greater than 130 GPa, greater than 140 GPa, greater than 16.20 GPa, greater than 180 GPa, greater than 200 GPa, and greater than 220 GPa. In some embodiments, the first nickel alloy wire has a Young's Modulus of about 140 GPa, about 160 GPa, about 180 GPa, about 200 GPa, about 210 GPa, about 220 GPa, about 240 GPa, or about 280 GPa. In other embodiments, the first nickel alloy wire has a Young's Modulus of from about 140 GPa to about 300 GPa. This includes a Young's Modulus of from about 150 GPa to about 290 GPa, from about 160 GPa to about 280 GPa, from about 180 GPa to about 240 GPa, from about 200 GPa to about 220 GPa, or from about 210 GPa to about 215 GPa, and ranges between any two of these values or less than any one of these values. In some embodiments, the first nickel alloy wire has a Young's Modulus of greater than 140 GPa. In some embodiments, the first nickel alloy wire has a Young's Modulus of greater than 180 GPa. In some embodiments, the first nickel alloy wire has a Young's Modulus of greater than 200 GPa. In some embodiments, the first nickel alloy wire has a Young's Modulus of about 210 GPa. In some embodiments, the first nickel alloy wire has a Young's Modulus of from about 180 GPa to about 240 GPa.

In another aspect, an expanded metal mesh is provided. The expanded metal mesh may be produced by expanding a sheet or coil of metal of appropriate thickness by a suitable expansion factor of at least 10 times its original area. A large number of small cuts are made in the sheet and the sheet is stretched out so that the material forms openings of the desired shape and size. The sheet or coil may be annealed prior to or after the expansion. The expanded metal mesh may be made from any suitable metal or alloy, including for example, pure nickel, or the same material as the first nickel alloy wire or the second nickel alloy wire. In some embodiments, the expanded metal mesh includes a nickel metal alloy comprising at least 90 wt % nickel and less than 10 wt % aluminum. In other embodiments, the expanded metal mesh includes a nickel metal alloy which includes from about 93 wt % to about 97 wt % nickel and from about 3 wt % to about 7 wt % aluminum.

The wire mesh of the disclosed embodiments may be included as a component in a conventional electrochemical cell such as batteries. These include, for example, galvanic cells, such as in metal-air cells, e.g., zinc-air cell. Metal-air cells comprising the wire mesh described herein may usefully be constructed as button cells for the various applications such as hearing aid batteries, and in watches, clocks, timers, calculators, laser pointers, toys, and other novelties. It shall be understood, however, that the present invention has application to electrochemical cells other than button cells. For example, the wire mesh may find application in any metal air cell using flat, bent, or cylindrical electrodes. Among the cylindrical metal-air cells, the cathode active material is applicable to those shaped for any button, hearing aid, AA, AAA, AAAA, C, or D cells. Use of the wire mesh as components in other forms of electrochemical cells is also contemplated.

In one embodiment, a cathode current collector for an air battery may include the wire mesh described above. In some embodiments, the wire mesh is included as a cathode current collector in a zinc-air battery. In one embodiment, the zinc-air battery may be configured in accordance or consistent with conventional zinc-air battery cell designs, but with the improvements provided in detail herein. For example, in various embodiments the zinc-air battery may be designed to specifications suitable for a zinc-air button size battery.

In one embodiment, a cathode current collector which includes a warp composed of a first nickel alloy wire having a first peak tensile strength and a weft composed of a wire which includes nickel and having a second peak tensile strength is provided. In some embodiments, the first peak tensile strength is greater than or equal to the second peak tensile strength. In some embodiments, the current collector is a cathode current collector. In some embodiments, the current collector is a cathode current collector in a zinc-air battery. Apart from the mesh described herein, the current collector may take a variety of forms. For example, the current collector may be a wire, bar, strip, perforated sheet, and the like. In some embodiments, the current collector is a mesh wire current collector.

The mesh wire current collector may be included in a cathode disc along with other components such as a porous diffusion layer and a cathode layer including carbon. When the cathode disc, containing a mesh wire current collector, is inserted into a cathode can, the contact edges of the wire within the cut disc resist buckling, leading to better contact between the current collector and the can walls. The Ni-Alloy wire and the wire meshes described herein exhibit excellent tensile strength at break and excellent tensile modulus of elasticity as well as inertness to chemicals, e.g., electrolytes and caustic additives in the electrolytes. The mesh wire cathode current collector described herein maintains better contact to the sidewall of the can, resulting in lower impedance and lower cell scrap.

In one aspect, a zinc-air battery is provided that includes a wire mesh current collector having a warp and a weft. The warp includes a first nickel alloy wire having a first peak tensile strength, and the weft includes a wire comprising nickel and having a second peak tensile strength, such that the first peak tensile strength is greater than or equal to the second peak tensile strength. The first nickel alloy wire and the wire including nickel are as described herein. The zinc-air battery further includes an anode comprising zinc, an electrolyte, and a separator.

The anode may contain zinc or a zinc alloy functioning as a negative electrode active material. In some embodiments, the anode includes a mercury-free zinc alloy powder. The anode may be in any form or shape such as particulate, plate, and gel. The zinc alloy may be amalgamated or mercury-free alloys with magnesium, aluminum, lithium, bismuth, indium, lead, or the like. The amount of the zinc alloy is not particularly limited as long as the alloy ensures a desired performance as the negative electrode active material. Preferable zinc alloy is a mercury-free zinc alloy without mercury and lead, and those containing aluminum, bismuth, indium, or a combination of any two or more thereof. The anode may be supported by a suitable current collector composed conductive material plate or mesh, including the wire mesh described herein. Illustrative materials for the anode current collector include nickel-based materials. For example, alloys of nickel and aluminum may be used. Other metals that may be included in the alloy include, but are not limited to, copper, iron, manganese, and titanium, as well as non-metals such as, but not limited to, silicon, carbon, and sulfur. Illustrative materials are commercially available as Duranickel® alloy 301, from Special Metals Corporation, Huntington, W. Va.

A variety of electrolyte solutions generally used for the zinc-air battery may be used as the electrolyte solution. Examples of the electrolyte solution include alkaline metal hydroxide aqueous solutions such as a potassium hydroxide aqueous solution and a sodium hydroxide aqueous solution; solutions containing zinc chloride or zinc perchlorate; non-aqueous solvents containing zinc perchlorate; and nonaqueous solvents containing zinc bis(trifluoromethylsulfonyl) imide. In some embodiments, the electrolyte includes an alkaline metal hydroxide aqueous solution, for example, potassium hydroxide solution. In some embodiments, a potassium hydroxide aqueous solution containing potassium hydroxide of from 30 to 45 wt % is used as the electrolyte. In some embodiments, the electrolyte includes an amphoteric fluorosurfactant such as Capstone® FS-50, Chemguard S-111, Chemguard S-500, APFS-14, or a combination of any two or more thereof. The electrolyte may further include a surfactant such as e.g., hexyl diphenyl oxide disulfonic acid. The electrolyte may also include a corrosion inhibitor, a gelling agent, zinc oxide, potassium hydroxide, sodium hydroxide, indium hydroxide, polyacrylate polymer, or a combination of any two or more thereof. In some embodiments, the electrolyte includes an potassium hydroxide aqueous solution.

The zinc-air battery may include a separator between the air cathode and the zinc anode, which is designed for preventing short-circuiting between the two electrodes. The separator may include a permeable membrane or a porous film made of non-conductive material. The separator may be made of any alkaline resistant material, including, but not limited to, polypropylene, Teflon™, nylon, polyethylene, polyvinyl chloride, polystyrene, polyphenylene oxide, cellophane, or acrylonitrile, and combinations thereof. In some embodiments, the separator includes polypropylene.

In one aspect, a zinc-air battery is provided, which includes a wire mesh current collector wherein a metal of the wire mesh is substantially insoluble in an aqueous caustic electrolyte. In one embodiment, the wire mesh has less than 40 wt %, less than 30 wt %, less than 10 wt %, less than 5 wt % or less than 2 wt % solubility in the aqueous caustic electrolyte.

In one aspect, a zinc-air battery is provided, which includes a wire mesh current collector comprising a wire warp and a wire weft, wherein the current collector exhibits at least one or more of the following properties: (a) a metal of the wire mesh is substantially insoluble in an aqueous caustic electrolyte; (b) a wire of the warp or weft prior to incorporation in the mesh exhibits a hardness of from about 130 to about 375 Brinell; (c) a wire of the warp or weft prior to incorporation in the mesh exhibits a resistivity of from about $2\times10^{-7}$ $\Omega$m to about $5\times10^{-7}$ $\Omega$m at 20° C.; (d) a wire of the warp or weft prior to incorporation in the mesh exhibits a peak tensile strength of greater than 140 ksi; and (e) a wire of the warp or weft prior to incorporation in the mesh exhibits a Young's Modulus of from about 180 GPa to about 240 GPa.

Figure 2:
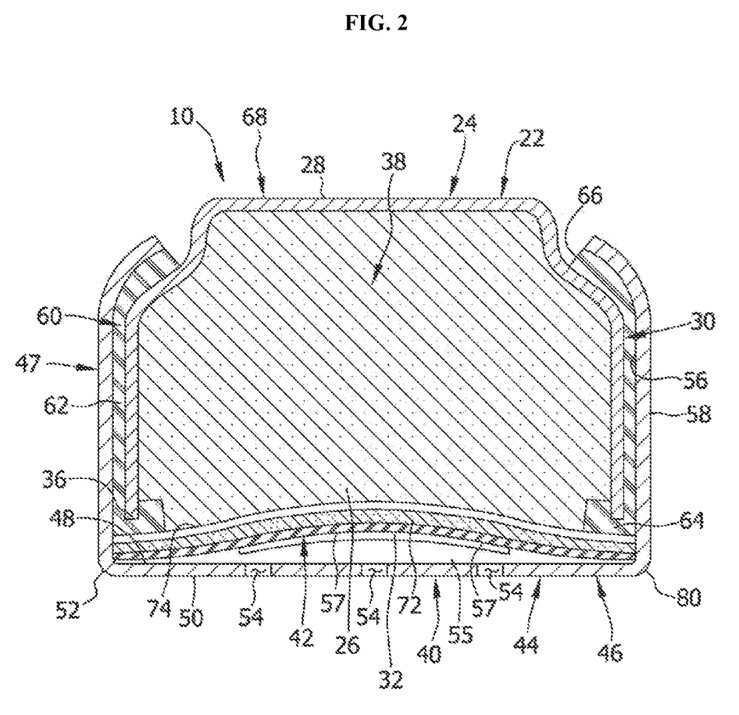
FIG. 2 is a cross-sectional, schematic view depicting an exemplary electrochemical cell of an embodiment of the present disclosure.

Turning to the figures, a zinc-air battery cell of the present disclosure is illustrated in FIG. 2, although other designs should not be so limited. Referring specifically to FIG. 2, the cell 10 of the zinc-air battery, the negative electrode contains the anode can assembly 22, with an anode can 24 including an electrochemically reactive anode 26 contained therein and an insulating gasket 60. The anode can 24 has a base wall 28, and circumferential downwardly-depending side wall 30. Side walls 30 terminate in a circumferential can foot 36. The base wall and side walls 30 generally define the anode cavity 38 within the anode can 24, which cavity contains the anode 26.

The cathode 42 comprises the area from below the separator 74 to the cathode can 44. This cathode 42 area includes the porous diffusion layer 57 and the cathode active layer 72. The wire mesh is included as a current collector in the cathode active layer 72. Cathode can 44 has a bottom 46, and a circumferential upstanding side wall 47. Bottom 46 has a generally flat inner surface 48, a generally flat outer surface 50, and an outer perimeter 52 defined on the flat outer surface 50. A plurality of air ports 54 extend through the bottom 46 of the cathode can 44, providing avenues for traverse of oxygen through the bottom 46 into the adjacent cathode can assembly 40. An air reservoir 55 spaces the cathode can assembly 40 from bottom 46 and the corresponding air ports 54. A porous diffusion layer 57 and a cellulose air diffusion layer 32 fill the air reservoir 55. Side wall 47 of the cathode can has an inner surface 56 and an outer surface 58.

The anode can assembly 22 is electrically insulated from the cathode can assembly 40 by an insulating gasket 60. Insulating gasket 60 includes a circumferential side wall 62 disposed between the upstanding side wall 47 of the cathode can and the downwardly-depending side wall 30 of the anode can. An insulating gasket foot 64 is disposed generally between the can foot 36 of the anode can and the cathode can assembly 40. An insulating gasket top 66 is positioned at the locus where the side wall 62 of insulating gasket 60 extends from between the side walls 30 and 47 adjacent the top of the cell.

The outer surface 68 of the cell 10 is thus defined by portions of the outer surface of the top of the anode can 24, outer surface 58 of the side wall 47 of the cathode can 44, outer surface 50 of the bottom of the cathode can 44, and the top 66 of the insulating gasket 60.

In one embodiment, porous diffusion layer 57 is a microporous hydrophobic polymeric material such as a polytetrafluoroethylene (PTFE) membrane about 25 to about 100 microns thick, which permits passage of air therethrough and which is generally impervious to battery electrolyte. In one embodiment, the porous diffusion layer 57 is Teflon™. In some embodiments, the porous diffusion layer 57, in combination with the air ports 54, is used to efficiently transport oxygen to the active reaction surface area of the cathode assembly.

In one embodiment, the cellulose air diffusion layer 32 is located underneath the porous diffusion layer 57 and acts as a protective lateral air diffusion layer. Specifically, when the cell is activated, the anode can assembly 22 presses down on the separator 74 and the cellulose air diffusion layer 32 helps to protect the air ports 54 from being completely covered. In one embodiment, the thickness of the cathode assembly between the separator 74 and the porous diffusion layer 57 is as small as possible.

In another embodiment, the zinc-air battery may be prepared by any means known in the art, so long as the resulting battery does not conflict with the disclosures presented herein. Thus, the present disclosure includes a method of preparing a zinc-air battery including the components and their respective concentrations as discussed throughout the entirety of this disclosure.

Various aspects of the invention are set out in the following embodiments.

Embodiment A

A wire mesh comprising: a warp comprising a first nickel alloy wire having a first peak tensile strength; a weft comprising a wire comprising nickel and having a second peak tensile strength; wherein: the first peak tensile strength is greater than or equal to the second peak tensile strength.

Embodiment B

The wire mesh of Embodiment A, wherein the wire comprising nickel has greater than 99% nickel.

Embodiment C

The wire mesh of Embodiment A or B, wherein the wire comprising nickel has greater than 99.5% nickel.

Embodiment D

The wire mesh of any one of Embodiments A-C, wherein the first nickel alloy wire comprises at least 90 wt % nickel and less than 10 wt % aluminum.

Embodiment E

The wire mesh of any one of Embodiments A-D, wherein the first nickel alloy wire comprises from about 93 wt % to about 97 wt % nickel and from about 3 wt % to about 7 wt % aluminum.

Embodiment F

The wire mesh of any one of Embodiments A-E, wherein the first nickel alloy wire further comprises at least one of copper, iron, manganese, carbon, silicon, sulfur, and titanium.

Embodiment G

The wire mesh of any one of Embodiments A-F, wherein the first nickel alloy wire has a resistivity of from about $2\times10^{-7}$ $\Omega$m to about $5\times10^{-7}$ $\Omega$m at 20° C.

Embodiment H

The wire mesh of any one of Embodiments A-G, wherein the wire comprising nickel is an annealed wire.

Embodiment I

The wire mesh of any one of Embodiments A-H, wherein the first nickel alloy wire has a peak tensile strength of greater than 140 ksi.

Embodiment J

The wire mesh of any one of Embodiments A-I, wherein the first nickel alloy wire has a peak tensile strength of greater than 180 ksi.

Embodiment K

The wire mesh of any one of Embodiments A-J, wherein the first nickel alloy wire has a peak tensile strength of greater than 200 ksi.

Embodiment L

The wire mesh of any one of Embodiments A-K, wherein the first nickel alloy wire has a peak tensile strength of greater than 210 ksi.

Embodiment M

The wire mesh of any one of Embodiments A-L, wherein the first nickel alloy wire has a peak tensile strength of less than 350 ksi.

Embodiment N

The wire mesh of any one of Embodiments A-M, wherein the first nickel alloy wire has a peak tensile strength of less than 300 ksi.

Embodiment O

The wire mesh of any one of Embodiments A-N, wherein the first nickel alloy wire has a peak tensile strength of less than 230 ksi.

Embodiment P

The wire mesh of any one of Embodiments A-O, wherein the first nickel alloy wire has a peak tensile strength of from about 140 ksi to about 250 ksi.

Embodiment Q

The wire mesh of any one of Embodiments A-P, wherein the first nickel alloy wire has a peak tensile strength of from about 200 ksi to about 225 ksi.

Embodiment R

The wire mesh of any one of Embodiments A-Q, wherein the second nickel alloy wire has a peak tensile strength of greater than 60 ksi.

Embodiment s

The wire mesh of any one of Embodiments A-R, wherein the second nickel alloy wire has a peak tensile strength of greater than 80 ksi.

Embodiment T

The wire mesh of any one of Embodiments A-S, wherein the second nickel alloy wire has a peak tensile strength of greater than 100 ksi.

Embodiment U

The wire mesh of any one of Embodiments A-T, wherein the second nickel alloy wire has a peak tensile strength of greater than 120 ksi.

Embodiment V

The wire mesh of any one of Embodiments A-U, wherein the second nickel alloy wire has a peak tensile strength of greater than 150 ksi.

Embodiment W

The wire mesh of any one of Embodiments A-V, wherein the second nickel alloy wire has a peak tensile strength of greater than 200 ksi.

Embodiment X

The wire mesh of any one of Embodiments A-W, wherein the second nickel alloy wire has a peak tensile strength of from about 80 ksi to about 150 ksi.

Embodiment Y

The wire mesh of any one of Embodiments A-X, wherein the second nickel alloy wire has a peak tensile strength of from about 110 ksi to about 140 ksi.

Embodiment Z

The wire mesh of any one of Embodiments A-Y, wherein the mesh count of the wire mesh is from about 16×16 wires per inch to about 60×60 wires per inch.

Embodiment AA

The wire mesh of any one of Embodiments A-Z, wherein the mesh count of the wire mesh is from about 30×30 wires per inch to about 40×40 wires per inch.

Embodiment BB

The wire mesh of any one of Embodiments A-AA, wherein the mesh count of the wire mesh is from about 16×60 wires per inch to about 60×16 wires per inch.

Embodiment CC

The wire mesh of any one of Embodiments A-BB, wherein the wire comprising nickel has a greater cross-sectional diameter than the first nickel alloy wire.

Embodiment DD

The wire mesh of any one of Embodiments A-CC, wherein the cross-section diameters of the wire comprising nickel and the first nickel alloy wire have a ratio of about 1:1 to about 2:1.

Embodiment EE

The wire mesh of any one of Embodiments A-DD, wherein the cross-section diameters of the wire comprising nickel and the first nickel alloy wire are equal or about equal.

Embodiment FF

The wire mesh of any one of Embodiments A-EE, wherein the wire comprising nickel is a second nickel alloy wire.

Embodiment GG

The wire mesh of any one of Embodiment FF, wherein first and the second nickel alloy wires are of the same wire.

Embodiment HH

The wire mesh of any one of Embodiments A-GG having a mesh density from about 0.1 to about 0.5.

Embodiment II

The wire mesh of any one of Embodiments A-HH which is formed by cold calendaring of the warp and the weft, which is formed by thermal bonding, or which is formed by coating of the mesh with another metal.

Embodiment JJ

The wire mesh of any one of Embodiments A-II which is a woven mesh comprising a plain weave, a basket weave, a twill weave, a satin weave, a herringbone weave, a leno weave, a rep weave, a rib weave, a warp rib weave, a Dutch weave, or a velour weave.

Embodiment KK

The wire mesh of any one of Embodiments A-JJ having a thickness from about 5 to about 20 μM.

Embodiment LL

The wire mesh of any one of Embodiments A-KK having a thickness from about 14 to about 17 μM.

Embodiment MM

The wire mesh of any one of Embodiments A-LL, wherein the first nickel alloy wire has a Young's Modulus of greater than 140 GPa.

Embodiment NN

The wire mesh of any one of Embodiments A-MM, wherein the first nickel alloy wire has a Young's Modulus of greater than 180 GPa.

Embodiment OO

The wire mesh of any one of Embodiments A-NN, wherein the first nickel alloy wire has a Young's Modulus of greater than 200 GPa.

Embodiment PP

The wire mesh of any one of Embodiments A-OO, wherein the first nickel alloy wire has a Young's Modulus of about 210 GPa.

Embodiment QQ

The wire mesh of any one of Embodiments A-PP, wherein the first nickel alloy wire has a Young's Modulus of from about 180 GPa to about 240 GPa.

Embodiment RR

The wire mesh of any one of Embodiments A-QQ, wherein the warp exhibits a microhardness from about 180 kgf/mm$^2$ to about 350 kgf/mm$^2$, and the weft exhibits a microhardness from about 90 kgf/mm$^2$ to about 150 kgf/mm$^2$.

Embodiment SS

An expanded metal mesh comprising a nickel metal alloy comprising at least 90 wt % nickel and less than 10 wt % aluminum.

Embodiment TT

The expanded metal mesh of Embodiment SS, wherein the nickel metal alloy comprises from about 93 wt % to about 97 wt % nickel and from about 3 wt % to about 7 wt % aluminum.

Embodiment UU

The expanded metal mesh of any one of Embodiments SS-TT, wherein the nickel metal alloy further comprises at least one of copper, iron, manganese, carbon, silicon, sulfur, and titanium.

Embodiment VV

The expanded metal mesh of any one of Embodiments SS-UU, wherein the nickel metal alloy comprises of nickel metal alloy wires.

Embodiment WW

The expanded metal mesh of any one of Embodiments SS-VV, wherein the nickel metal alloy wire has a resistivity of from about 2×10-7 Ωm to about 5×10-7 Ωm at 20° C.

Embodiment XX

The expanded metal mesh of any one of Embodiments SS-WW, wherein the nickel metal alloy wire has a peak tensile strength of greater than 140 ksi.

Embodiment YY

The expanded metal mesh of any one of Embodiments SS-XX, wherein the nickel metal alloy wire has a peak tensile strength of greater than 180 ksi.

Embodiment ZZ

The expanded metal mesh of any one of Embodiments SS-YY, wherein the nickel metal alloy wire has a peak tensile strength of greater than 200 ksi.

Embodiment AAA

The expanded metal mesh of any one of Embodiments SS-ZZ, wherein the nickel metal alloy wire has a peak tensile strength of greater than 210 ksi.

Embodiment BBB

The expanded metal mesh of any one of Embodiments SS-AAA, wherein the nickel metal alloy wire has a peak tensile strength of less than 350 ksi.

Embodiment CCC

The expanded metal mesh of any one of Embodiments SS-BBB, wherein the nickel metal alloy wire has a peak tensile strength of less than 300 ksi.

Embodiment DDD

The expanded metal mesh of any one of Embodiments SS-CCC, wherein the nickel metal alloy wire has a peak tensile strength of less than 230 ksi.

Embodiment EEE

The expanded metal mesh of any one of Embodiments SS-DDD, wherein the nickel metal alloy wire has a peak tensile strength of from about 140 ksi to about 250 ksi.

Embodiment FFF

The expanded metal mesh of any one of Embodiments SS-EEE, wherein the nickel metal alloy wire has a peak tensile strength of from about 200 ksi to about 225 ksi.

Embodiment GGG

A zinc-air battery comprising: a wire mesh current collector comprising: a warp comprising a first nickel alloy wire having a first peak tensile strength; a weft comprising a wire comprising nickel and having a second peak tensile strength; wherein: the first peak tensile strength is greater than or equal to the second peak tensile strength. Or, a zinc-air battery comprising the wire mesh of any one of Embodiments A-RR or Embodiments SS-FFF.

Embodiment HHH

The zinc-air battery of Embodiment FFF further comprising an anode comprising zinc, an electrolyte, and a separator.

Embodiment III

A zinc-air battery comprising: a wire mesh current collector comprising: a wire warp; a wire weft; wherein at least two of the following are exhibited: a metal of the wire mesh is substantially insoluble in an aqueous caustic electrolyte; a wire of the warp or weft prior to incorporation in the mesh exhibits a hardness of from about 130 to about 375 Brinell; a wire of the warp or weft prior to incorporation in the mesh exhibits a resistivity of from about $2\times10^{-7}$ $\Omega m$ to about $5\times10^{-7}$ $\Omega m$ at 20° C.; a wire of the warp or weft prior to incorporation in the mesh exhibits a peak tensile strength of greater than 140 ksi; and a wire of the warp or weft prior to incorporation in the mesh exhibits a Young's Modulus of from about 180 GPa to about 240 GPa.

Embodiment JJJ

A zinc-air battery comprising: a wire mesh current collector comprising: a wire warp comprising a first nickel alloy; a wire weft comprising a second nickel alloy; wherein the first and second nickel alloys are substantially insoluble in an aqueous caustic electrolyte; the warp exhibits a microhardness from about 180 kgf/mm$^2$ to about 350 kgf/mm$^2$, and the weft exhibits a microhardness from about 90 kgf/mm$^2$ to about 150 kgf/mm$^2$; a wire of the warp prior to incorporation in the mesh exhibits a resistivity of from about $2\times10^{-7}$ $\Omega m$ to about $5\times10^{-7}$ $\Omega m$ at 20° C.; a wire of the warp prior to incorporation in the mesh exhibits a peak tensile strength of greater than 140 psi; and a wire of the warp prior to incorporation in the mesh exhibits a Young's Modulus of from about 180 GPa to about 240 GPa.

The wire mesh described herein has several advantageous properties such as for example, improved dimensional integrity, high corrosion resistance, high oxidation resistance, good structural uniformity and high wear resistance. These wires when used as current collectors in batteries exhibit advantages such as low impedance and low scrap value.

The present invention, thus generally described, will be understood more readily by reference to the following examples, which are provided by way of illustration and are not intended to be limiting of the present invention.

EXAMPLES

Example 1

Preparation of the wire mesh. In preparing a wire from the first nickel alloy or the wire containing nickel as specified for use as warp or weft wire, the wire is drawn to required gauge and is sufficiently annealed prior to weaving. Wire rod is drawn and annealed to differing degrees to the final desired wire gauge. The wire is woven into a mesh on looms in a customary fashion.

Example 2

Preparation of the zinc-air battery. The composite mesh structure (cathode) obtained in Example 1, is fed, in strip form, through a punch/die blanking set. The composite mesh structure is cut into a circular disc of desired diameter and inserted into a metal can that constrains the circular disc both radially and axially. The anode, which may contain an anode material, an electrolyte and other additives, is inserted into the cathode portion and crimped closed.

Example 3

Figure 3:
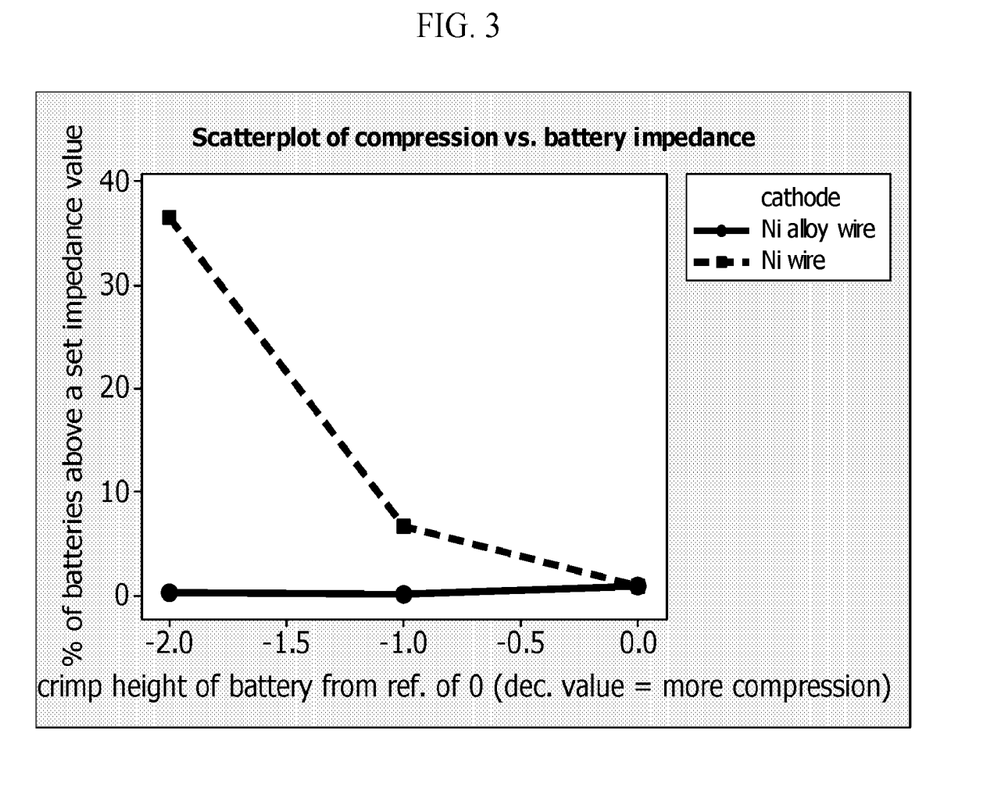
FIG. 3 is a graph of the percentage of batteries having an impedance measurement above a given threshold versus the crimp height for the nickel alloy current collector batteries and nickel wire control batteries.

Comparison of zinc-air batteries. In the following examples, zinc-air battery cells were tested using a control cathode and an cathode having the nickel alloy wire mesh current collector. The control cathode, included a nickel current collector. After battery fabrication and crimping of the anode to the cathode, impedance measurements were obtained. The percentage of assembled batteries having an impedance measurement above a given threshold was graphed v. the crimp height for both the nickel alloy current collector batteries and the control batteries. The graph is provided in FIG. 3. As will be noted, as the crimp height decreases, percentage of impedance failures increases for the controls, while very little impact is noted for the nickel alloy wire mesh current collector batteries.

While certain embodiments have been illustrated and described, it should be understood that changes and modifications may be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations may be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which may of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like, include the number recited and refer to ranges which may be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A zinc-air battery comprising:
a zinc anode;
an air cathode comprising:
a wire mesh current collector comprising:
a warp comprising a first nickel alloy wire having a first peak tensile strength;
a weft comprising a wire comprising nickel and having a second peak tensile strength;
wherein:
the first peak tensile strength is greater than or equal to the second peak tensile strength; and
the first nickel alloy wire comprises 90 wt % to 99 wt % nickel and 1 wt % to 10 wt % aluminum.

2. The zinc battery of claim 1, wherein the first nickel alloy wire has a resistivity of from about 2×10-7 Ωm to about 5×10-7 Ωm at 20° C.

3. The zinc battery of claim 1, wherein the first nickel alloy wire has a peak tensile strength of greater than 140 ksi.

4. The zinc battery of claim 1, wherein the wire comprising nickel has a peak tensile strength of greater than 60 ksi.

5. The zinc battery of claim 1, wherein the mesh count of the wire mesh is from about 16×16 wires per inch to about 60×60 wires per inch.

6. The zinc battery of claim 1, wherein the wire comprising nickel is a second nickel alloy wire.

7. The zinc battery of claim 6, wherein the second nickel alloy wire comprises at least 90 wt % nickel and less than 10 wt % aluminum.

8. The zinc battery of claim 6, wherein the second nickel alloy wire has a resistivity of from about 2×10-7 Ωm to about 5×10-7 Ωm at 20° C.

9. The zinc battery of claim 1 having a mesh density from about 0.1 to about 0.5.

10. The zinc battery of claim 1, wherein the warp exhibits a microhardness from about 180 kgf/mm$^2$ to about 350 kgf/mm$^2$, and the weft exhibits a microhardness from about 90 kgf/mm$^2$ to about 150 kgf/mm$^2$.

11. The zinc battery of claim 1, which is a woven mesh comprising a plain square weave, a twill square weave, plain Dutch weave, or a twill Dutch weave.

12. The zinc battery of claim 1, wherein a wire of the warp exhibits a microhardness of about 160 kgf/mm$^2$ to about 350 kgf/mm$^2$.

13. The zinc battery of claim 1, wherein the first nickel alloy wire has a Young's Modulus of greater than 140 GPa.

14. A zinc-air battery comprising:
a zinc anode;
an air cathode;
a wire mesh current collector comprising:
a wire warp comprising a first nickel alloy, wherein the first nickel alloy wire comprises 90 wt % to 99 wt % nickel and 1 wt % to 10 wt % aluminum;
a wire weft comprising a second nickel alloy;
wherein:
the first and second nickel alloys are substantially insoluble in an aqueous caustic electrolyte;

the warp exhibits a microhardness from about 180 kgf/mm$^2$ to about 350 kgf/mm$^2$, and the weft exhibits a microhardness from about 90 kgf/mm$^2$ to about 150 kgf/mm$^2$;
a wire of the warp prior to incorporation in the mesh exhibits a resistivity of from about 2×10$^{-7}$ Ωm to about 5×10$^{-7}$ Ωm at 20° C.;
a wire of the warp prior to incorporation in the mesh exhibits a peak tensile strength of greater than 140 ksi; and
a wire of the warp prior to incorporation in the mesh exhibits a Young's Modulus of from about 180 GPa to about 240 GPa.

15. A wire mesh comprising:
a warp comprising a first nickel alloy wire having a first peak tensile strength;
a weft comprising a wire comprising nickel and having a second peak tensile strength;

wherein:
the first peak tensile strength is greater than or equal to the second peak tensile strength; and
the first nickel alloy wire comprises 90 wt % to 99 wt % nickel and 1 wt % to 10 wt % aluminum.

16. The wire mesh of claim 15, wherein the first nickel alloy wire has a peak tensile strength of from about 140 ksi to about 250 ksi.

17. The zinc battery of claim 1, wherein first nickel alloy wire comprises from about 93 wt % to about 97 wt % nickel and from about 3 wt % to about 7 wt % aluminum.

18. The wire mesh of claim 15, wherein first nickel alloy wire comprises from about 93 wt % to about 97 wt % nickel and from about 3 wt % to about 7 wt % aluminum.

19. The wire mesh of claim 15, wherein wire comprising nickel has peak tensile strength of 80 ksi to 150 ksi.

* * * * *